Feb. 23, 1937. W. HORSMAN 2,072,036
PORTABLE BAKING OVEN
Filed July 23, 1936 2 Sheets-Sheet 1
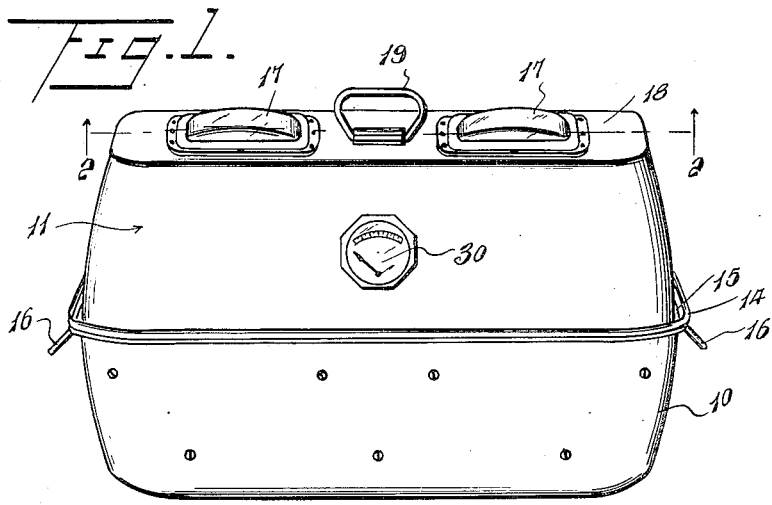
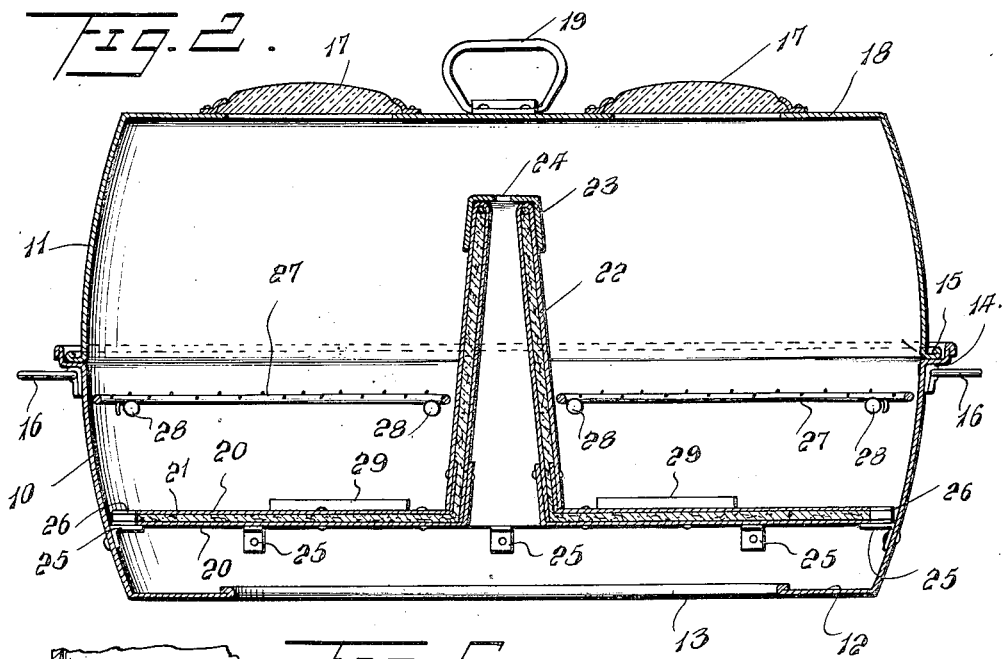
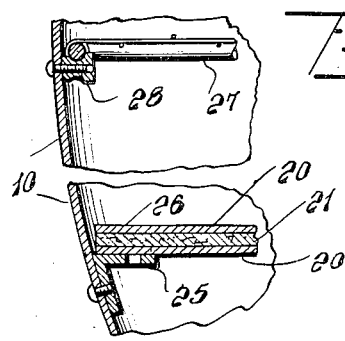
Inventor
William Horsman Feb. 23, 1937. W. HORSMAN 2,072,036
PORTABLE BAKING OVEN
Filed July 23, 1936 2 Sheets-Sheet 2
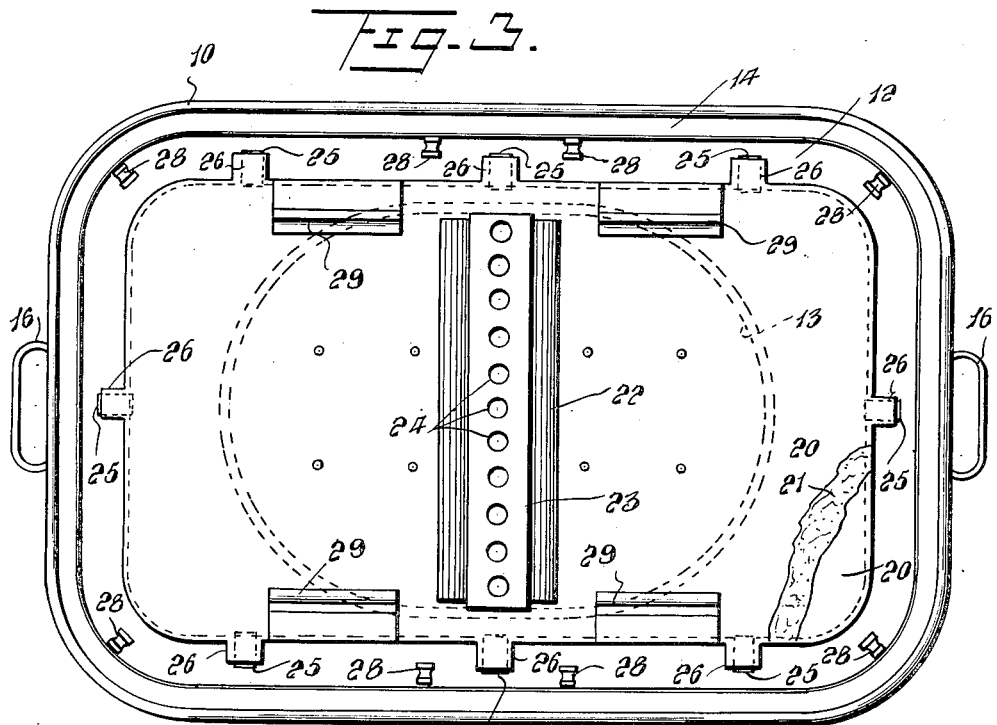
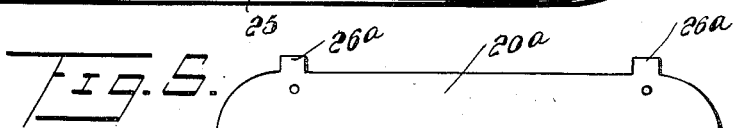
Inventor
William Horsman
By T. K. Bryant
Attorney.

Patented Feb. 23, 1937

2,072,036

UNITED STATES PATENT OFFICE 2,072,036

PORTABLE BAKING OVEN

William Horsman, Roxbury, Mass.

Application July 23, 1936, Serial No. 92,219

5 Claims. (Cl. 126—275)

This invention relates to certain new and useful improvements in portable baking ovens.

An object of the invention is to provide a portable oven designed for baking or roasting and one which may be used in connection with gas or electric stoves, coal or oil stoves.

The primary object of the invention is to provide a portable baking oven formed of a bottom and cover section with an opening in the bottom for the entrance of heating units and a heat deflector spaced upwardly of the lower end of the bottom with pan racks above the heat deflector, the latter being spaced at its marginal edges from the bottom and having a centrally disposed upstanding flue for the even distribution of heat through the upper end of the oven.

A further object of the invention is to provide a portable baking oven of the foregoing character wherein upstanding brackets or supports are carried by the heat deflector and upon which baking pans or the like may be placed in spaced relation to the heat deflector for certain baking operations, such as the baking of loaves of bread when it is not desired to use the pan racks.

The invention further contemplates the employment of a heat deflector in the form of a plate without a heat flue for direct placement thereon of a baking or roasting pan.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a perspective view of a portable baking oven constructed in accordance with the present invention;

Figure 2 is a vertical longitudinal sectional view taken on line 2—2 of Figure 1, showing the heat deflector with the central upstanding flue and pan racks carried by the bottom section of the oven;

Figure 3 is a top plan view of the lower section of the oven with the cover removed and the heat deflector in position therein and further showing a perforated damper plate associated with the heat flue rising from the deflector;

Figure 4 is a detail sectional view showing the upstanding heat flue rising from the heat deflector plate;

Figure 5 is a fragmentary plan view of another form of heat deflector plate without a flue section; and Figure 6 is a fragmentary detail sectional view showing the supports for the heat deflector and pan racks.

Referring more in detail to the accompanying drawings, there is illustrated a portable baking oven comprising a bottom section 10 and a removable cover section 11, the oven being preferably rectangular in plan view with outwardly bulged sides and ends to increase the interior area of the oven. As shown in Figure 2, the bottom wall 12 of the lower section 10 is provided with a relatively large heat entrance opening 13 while the upper edge of the lower section 10 is flanged outwardly as at 14 to provide a seat for the lower beaded edge 15 of the cover section 11. The opposite ends of the lower section 10 carry handles 16. Glass plugs 17 are set into openings in the top wall 18 of the cover section 11 for interior inspection of the oven during baking or roasting operations and said cover section 11 is also provided with a lifting handle 19.

A combined heat deflector and pan support is removably mounted in the lower section 10 of the oven and the construction of the heat deflector and pan support as shown in Figures 2 to 4 and 6 is of substantially rectangular form in plan view and of double metallic wall construction as shown at 20 with an intermediate asbestos layer 21. An upwardly tapering flue 22 of similar construction extends transversely of the deflector plate centrally thereof and a channel shaped damper plate 23 having spaced openings 24 therein is removably placed upon the upper end of the flue 22. The deflector plate is spaced slightly upwardly from the bottom wall 12 of the lower section 10 and is of less cross-sectional area than the adjacent part of the lower section so that heat units may pass upwardly into the oven around the marginal edge of the deflector plate and the support for the latter includes angle brackets 25 arranged in spaced relation and projecting inwardly from the walls of the lower section 10 and with which brackets lugs 26 projecting from the marginal edge of the deflector plate are engaged for the support of the deflector plate. Wire pan racks 27 are removably supported adjacent the upper end of the lower section 10 at each side of the flue 22 by means of supporting pins 28 extending inwardly from the walls of the lower section as shown in Figs. 2, 3, and 6.

In lieu of the form of heat deflector plate shown in Figs. 2 and 3, the plate 20a shown in Figure 5 may be employed and in this form of heat deflector plate, the same is closed over its entire area and is of a construction similar to the form of heat deflector plate 20. Marginal lugs 26a are carried by the plate 20a for mounting upon the angle brackets 25.

The oven may be placed upon any type of stove desired such as gas, oil, electric or the like with the heat passing upwardly into the oven through the bottom opening 13 in the lower section 10 to be deflected by the plate upwardly through the flue 22 and around the marginal edge of the plate for even distribution of the heat throughout the upper section of the oven. Baking pans can be placed upon the racks 27 and when desired, the racks 27 may be removed and the pans placed upon the heat deflector plate 20 and out of direct contact therewith by means of the abutments 29 rising from the plate 20 as shown in Figures 2 and 3. A temperature gage 30 is carried by the cover section 11 and progress of the baking and roasting operation are viewable through the glass plugs 17 in the top wall 18 of the cover section 11. The heat deflector plate 20 may be removed and the plate 20a shown in Fig. 5 substituted therefor so that a large roasting pan or kettle may be placed directly on the heat deflector plate. Passage of heat units out of the upper end of the flue 22 is retarded by the damper plate 23 for the reduction of the top heat.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a portable baking oven, upper and lower sections, a heat deflector and pan support carried by the lower section in upwardly spaced relation to the bottom wall thereof and spaced at its marginal edge from the side wall of the bottom section, pan racks supported in the bottom section above the heat deflector and means carried by the heat deflector and pan support for selectively increasing and decreasing top heat in the oven.

2. In a portable baking oven, upper and lower sections, a heat deflector and pan support carried by the lower section in upwardly spaced relation to the bottom wall thereof and spaced at its marginal edge from the side wall of the bottom section, pan racks supported in the bottom section above the heat deflector, a flue rising centrally of the heat deflector and a damper on the upper end of the flue.

3. In a portable baking oven, upper and lower sections, a heat deflector and pan support carried by the lower section in upwardly spaced relation to the bottom wall thereof and spaced at its marginal edge from the side wall of the bottom section, pan racks supported in the bottom section above the heat deflector, and means carried by the heat deflector and pan support and interposed between the pan racks for selectively increasing and decreasing top heat in the oven.

4. In a portable baking oven, upper and lower sections, a heat deflector and pan support carried by the lower section in upwardly spaced relation to the bottom wall thereof and spaced at its marginal edge from the side wall of the bottom section, pan racks supported in the bottom section above the heat deflector, a flue rising centrally of the heat deflector and a damper on the upper end of the flue, the support for the heat deflector including angle brackets on the inner side of the lower section and marginal lugs on the deflector seated on the brackets.

5. In a portable baking oven, upper and lower sections, a heat deflector and pan support carried by the lower section in upwardly spaced relation to the bottom wall thereof and spaced at its marginal edge from the side wall of the bottom section, pan racks supported in the bottom section above the heat deflector, a flue rising centrally of the heat deflector and a damper on the upper end of the flue, with a pan rack at each side of the flue.

WILLIAM HORSMAN.